A. C. SARGENT.
VAT HEATER.
APPLICATION FILED FEB. 9, 1912.
1,026,704.
Patented May 21, 1912.
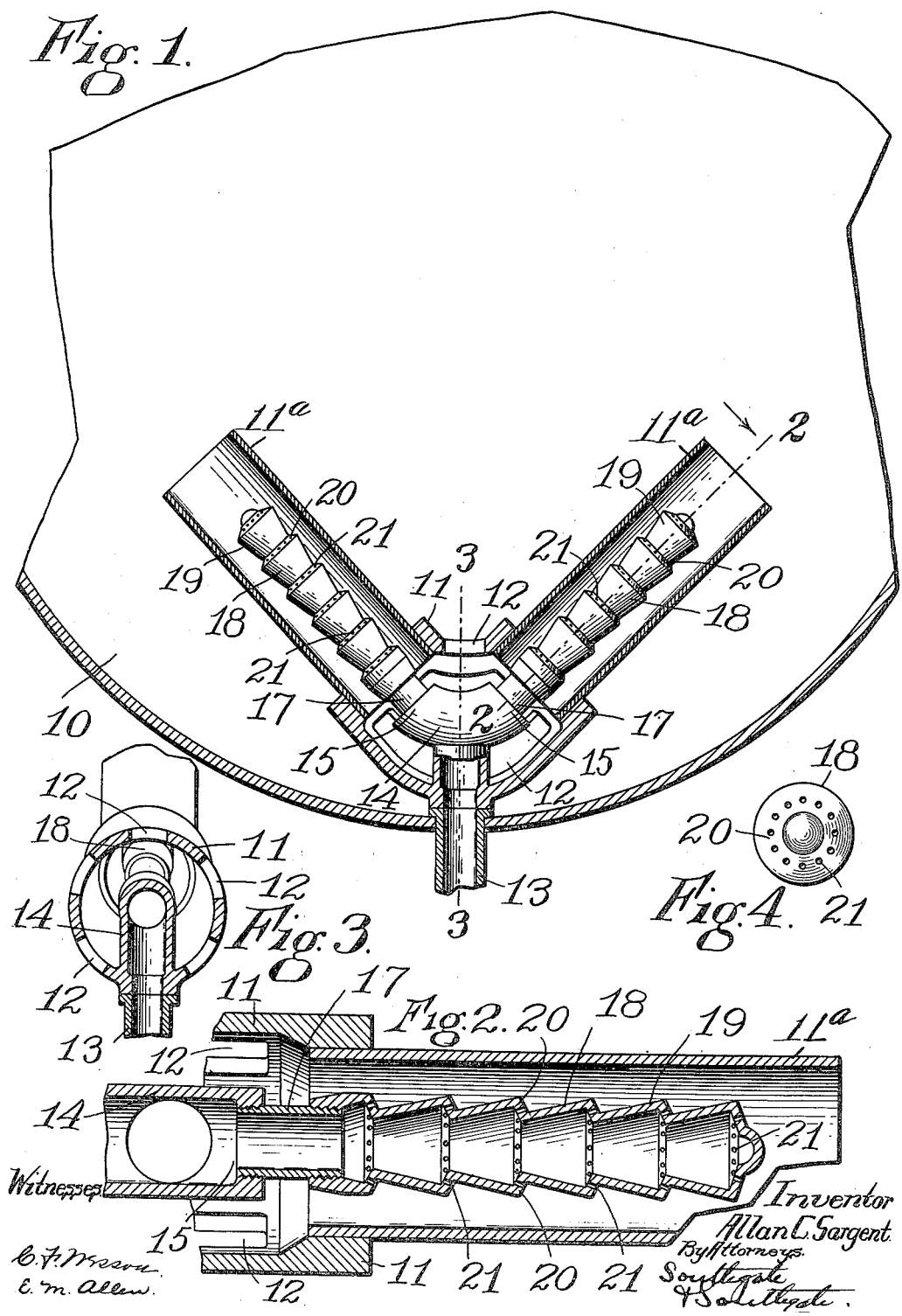

UNITED STATES PATENT OFFICE.

ALLAN C. SARGENT, OF WESTFORD, MASSACHUSETTS, ASSIGNOR TO C. G. SARGENT'S SONS CORPORATION, OF GRANITEVILLE, MASSACHUSETTS, A CORPORATION OF MASSACHUSETTS.

VAT-HEATER.

1,026,704.  Specification of Letters Patent.  Patented May 21, 1912.

Application filed February 9, 1912. Serial No. 676,644.

*To all whom it may concern:*

Be it known that I, ALLAN C. SARGENT, a citizen of the United States, residing at Westford, in the county of Middlesex and State of Massachusetts, have invented a new and useful Vat-Heater, of which the following is a specification.

This invention relates to a device for heating liquids in vats, tanks, and the like, and also for circulating the liquids therein and thereby mixing them thoroughly.

The principal object of the invention is to provide an exceedingly simple and effective mechanism for this triple purpose and one which involves few parts and those capable of being made mainly of unfinished castings.

The invention is designed primarily for heating liquid but also for obtaining a complete circulation effective for thorough mixing.

Another object of the invention is to provide an efficient form of steam heater which will cause the steam to be forced into contact with the coolest portions of the liquid without the so-called "pounding" which is incident to all steam vat heating devices with which I have been familiar.

Reference is to be had to the accompanying drawings, in which—

Figure 1 is a plan of a cylindrical vat having a preferred form of this invention applied thereto; Fig. 2 is a sectional view on the line 2—2 of Fig. 1 on enlarged scale; Fig. 3 is a sectional view on the line 3—3 of Fig. 1, and Fig. 4 is an end view of one of the nozzles.

The invention is shown as applied to a circular or cylindrical vat 10 for the purpose of showing how the circulation is secured in a vat of that shape, but it is equally applicable to vats of other forms. This vat is shown as provided near one side thereof with a casing 11 having openings 12 around its circumference for the admission of liquid into the casing and outlets 11ª. Into the side or the bottom of the vat extends a steam pipe 13 which discharges into a hollow member 14 in the center of the casing. This member is provided with two outlets 15 substantially opposite each other and centrally disposed with respect to the ends of the casing 11. If the vat has a straight side these openings are in alinement and opposite each other, but in the cylindrical vat shown they are turned out of alinement so as to bring them substantially parallel with the adjacent sides of the vat. In either case they are designed to direct the steam along the sides of the vat for the purpose of securing good circulation. Into the two ends of this member are secured short pipe lengths 17 on which are mounted nozzles 18. Each of these nozzles is made up of a plurality of integral truncated cones 19 arranged end to end. The base 20 of each cone is integrally connected, of course, with the smaller end of the next cone and these bases are provided with perforations 21 arranged in a circle around the same for directing jets of steam against the adjacent conical surface. The holes are so drilled as to cause the steam to flow along these conical surfaces and be spread out thereby. It will be understood, of course, that various dimensions can be used, but I have found in practice that with a nozzle about an inch in smallest inside diameter thirteen holes $\frac{1}{16}$th inch in diameter are a suitable number for each of these surfaces.

It has been found in practice that this arrangement provides an economical, efficient, and noiseless heating device for tanks of various kinds. The pounding of the steam is entirely done away with on account of the particular arrangement and location of the perforations 21 with respect to the conical surfaces, and the liquid is heated in an efficient and continuous manner and is caused to move outwardly from the nozzles and to circulate back in through the openings 12. In this way the coolest liquid is brought directly into contact with the steam and yet no disagreeable pounding is produced and the energy of this pounding action therefore is not lost. This is especially efficient in heating dye vats because it thoroughly mixes the dyestuff, and thus does away with the necessity of any other mixing under ordinary circumstances, although, of course, it can be used in connection with any mixing device.

Although I have illustrated and described a preferred embodiment of the invention, I am aware that many modifications can be made therein by any person skilled in the art without departing from the scope of the invention as expressed in the claims. Therefore, I do not wish to be limited to all the details of construction herein shown and described, but What I do claim is:—

1. As an article of manufacture, a vat heater having a conical surface, and means for directing fine jets of steam along said conical surface to spread the steam in the liquid to be heated.

2. As an article of manufacture, a vat heater comprising a nozzle having a plurality of conical surfaces, and jet openings for directing a heating fluid along said conical surfaces toward their larger ends.

3. The combination with a vat for holding liquids, of a heater therefor comprising a nozzle made up of a plurality of hollow truncated cones, the base of each one of which, except the end one, is connected with the small end of the next one, and provided with a circle of perforations therearound for directing jets of heating fluid along the next conical surface.

4. In a vat heater, the combination of a casing, a steam inlet and a nozzle projecting from said casing, connected with said steam inlet and comprising a series of conical surfaces each conical surface having a base connected with the small end of the next conical surface and provided with perforations in said base for directing jets of steam along the next conical surface.

5. In a device for heating, circulating, and mixing liquids in vats or the like, the combination of a casing, a steam pipe entering said casing, and a nozzle connected with the steam pipe within the casing and projecting from one end of the casing, and consisting of a plurality of hollow truncated cones connected together end to end, the base of each one projecting beyond the small end of the next one, and being provided with a series of perforations therethrough for permitting jets of steam to pass therefrom into contact with the conical surface next adjacent thereto.

6. The combination with a vat for containing liquids, of a circular casing at one side of the vat having openings therethrough between its ends, a hollow head within said casing substantially at the center thereof provided with opposite openings having nozzles projecting therefrom in opposite directions, each nozzle being made up of a series of integral truncated cones having perforated bases each projecting beyond the small end of the next cone in the series.

In testimony whereof I have hereunto set my hand, in the presence of two subscribing witnesses.

ALLAN C. SARGENT.

Witnesses:
 BERTHA S. GALBRAITH,
 FRANK COLLINS.